(12) United States Patent
Torney et al.

(10) Patent No.: US 8,128,956 B2
(45) Date of Patent: Mar. 6, 2012

(54) FOOD PRODUCT FOR HAIRBALL TREATMENT

(75) Inventors: Allan A. Torney, Bolton (CA); Kasim A. Zubair, Brampton (CA); Liisa Mooney, Toronto (CA); Frank Shields, La Verne, CA (US); Tiffany L. Bierer, Vernon, CA (US)

(73) Assignee: Mars, Inc., McLean, VA (US)

( * ) Notice: Subject to any disclaimer, the term of this patent is extended or adjusted under 35 U.S.C. 154(b) by 1239 days.

(21) Appl. No.: 10/939,206

(22) Filed: Sep. 10, 2004

(65) Prior Publication Data

US 2005/0084517 A1  Apr. 21, 2005

Related U.S. Application Data

(60) Provisional application No. 60/502,300, filed on Sep. 12, 2003.

(51) Int. Cl.
  A23K 1/17 (2006.01)
  A61K 47/00 (2006.01)
(52) U.S. Cl. ........ 424/442; 424/439
(58) Field of Classification Search ............. None
  See application file for complete search history.

(56) References Cited

U.S. PATENT DOCUMENTS

| | | | |
|---|---|---|---|
| 6,080,403 A | 6/2000 | Shields, Jr. et al. | |
| 6,117,477 A | 9/2000 | Paluch | |
| 6,254,910 B1 | 7/2001 | Paluch | |
| 6,312,746 B2 * | 11/2001 | Paluch | 426/282 |
| 6,383,529 B2 | 5/2002 | Davenport et al. | |
| 6,506,401 B1 * | 1/2003 | Rothamel et al. | 424/439 |
| 6,562,366 B2 | 5/2003 | Cook et al. | |
| 6,827,957 B2 | 12/2004 | Paluch et al. | |
| 2003/0066433 A1 | 4/2003 | Rothamel et al. | |
| 2003/0091668 A1 * | 5/2003 | Davenport et al. | 424/773 |
| 2003/0133923 A1 | 7/2003 | Cook et al. | |
| 2003/0147940 A1 | 8/2003 | Yoshida | |

OTHER PUBLICATIONS

Royal Canin Feline Nutrition, Hair and skin ## TM formula for adult Cats with sensitive skin and coat.*
IAMS Weight Control Hairball Ccare.*
*Cat Products Solutions Hairball Control*; Techni-Cat; www.technical.com.
*Veterinarian's Natural Care Best*; Cat Health Products; http://store.vetsbest.com.
*Iams Hairball Care*; Good for Life—IAMS; www.iams.com.
*Iams Weight Control Hairball Care™*; Good for Life—IAMS; www.iams.com.
*Eukanuba® Adult Hairball Relief Formula Recommended for Maintenance*; Eukanuba—What Healthy Pets Are Made Of; www.eukanuba.com.
*Pro Plan Dry Cat Food—Extra Care*, Hairball Management Chicken & Rice Formula; Purina Proplan Brand Cat Food; www.proplan.com.
*Pro Plan Dry Cat Food—Extra Care*, Hairball Management Salmon & Rice Formula; Purina Proplan Brand Cat Food; www.proplan.com.
*Pro Plan Dry Cat Food—Extra Care*, Hairball Management—Chicken & Liver Entrée; Purina Proplan Brand Cat Food; www.proplan.com.
*Pro Plan Cat Treats*, Hairball Remedy for Adult Cats; Purina Proplan Brand Cat Food; www.proplan.com.
*Hairball Control® Adult*; Hill's—The Global Leader in Pet Nutrition; www.hillspet.com.
*Hairball Control® Light Adult*; Hill's The Global Leader in Pet Nutrition; www.hillspet.com.
*Hairball Formula, 30% Protein / 14% Fat for Adult Cats Requiring Relief from Hairballs*; Eagle Pack, Hollistic—Natural Pet Foods; www.eaglepack.com.
*Hair & Skin 33™ Formula for Adult Cats with Sensitive Skin and Coat*; Royal Canin, Feline Nutrition; www.feline-nutrition.com.
*Hartz® Advanced Care™*, Hairball Remedy; HARTZ; www.hartz.com.
PETROMALT, Virbac Laxative; Virbac Corporation; http://valleyvet.naccvp.com.
IAMS Dental Care—Caring for Your Pet's Teeth.
IAMS Original With Ocean Fish and Rice.
IAMS Original with Chicken.
IAMS Active Maturity.
SIPA-BarleyMalt 48 (Organic Barley Malt Syrup).

* cited by examiner

*Primary Examiner* — Frederick Krass
*Assistant Examiner* — Snigdha Maewall
(74) *Attorney, Agent, or Firm* — Fulbright & Jaworski, LLP

(57) ABSTRACT

A pet food product for hairball treatment that includes a shell component completely surrounding an inner component to form one dual textured pet food product, wherein the shell component is harder than the inner component. The shell component can include a mixture of soluble and insoluble fiber and can include at least one ingredient comprising a carbohydrate, fat, protein or combination thereof. The inner component comprises a mixture of ingredients, wherein the ingredients include a lubricant.

7 Claims, 1 Drawing Sheet

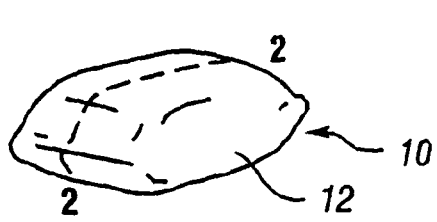
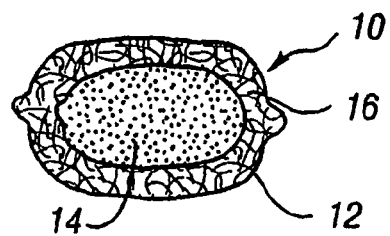
FIG. 1  FIG. 2
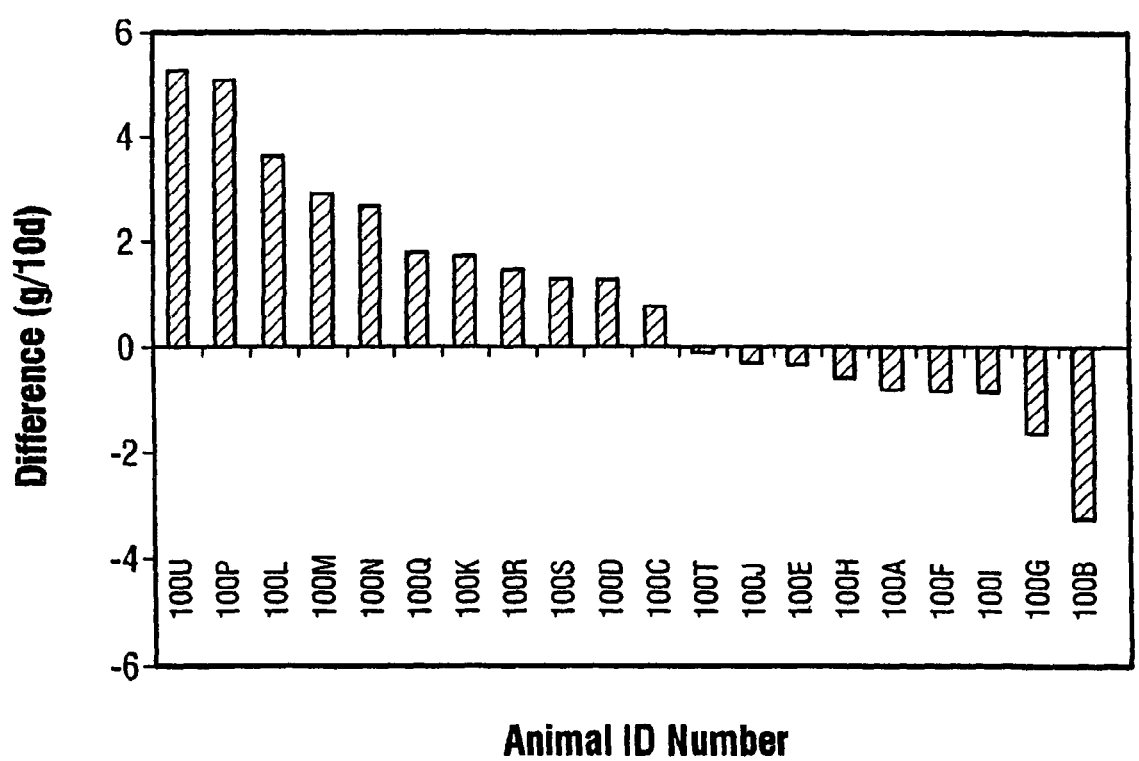
FIG. 3

FOOD PRODUCT FOR HAIRBALL TREATMENT

TECHNICAL FIELD

This invention relates to food products and, more particularly, to pet food products that include hairball control and prevention ingredients. Further, these pet food products may also provide for a significant increase in palatability.

BACKGROUND OF THE INVENTION

There are a number of patents and products on the market that are directed to controlling and preventing fecal hair excretion and trichobezoar (hairball) formation in animals such as cats, rabbits and ferrets. The patents or published application include U.S. Pat. No. 6,562,366 and U.S. Pub. No. 2003/0133923 which describe the use of a food grade fat emulsifiers, such as a Tween® surfactant, to reduce hairball size by degrading the enmeshed fat.

U.S. Pat. No. 6,383,529 and U.S. Pub. No. US 203/0091668 are directed to a process and composition for controlling hairball excretion and formation by feeding an animal a composition that includes 10 to 42 wt % crude protein, 4 to 30 wt % fat, 1 to 25 wt % total dietary fiber and supplemental fiber source. The supplemental fiber source includes either a blend of at least one fermentable fiber such as beet pulp and a cellulose ether or a blend of at least one fermentable fiber such as beet pulp, a cellulose ether and mineral oil.

U.S. Pat. No. 6,506,401 and U.S. Pub. No. US 2003/0066433 describe a two component pet food product that includes malt syrup and petroleum jelly or mineral oil as a hairball treatment formulation. U.S. Pat. No. 6,080,403 describes the use of bromelain to treat or prevent hairball formation and U.S. Pub. US 2003/0147940 describes the incorporation of 1 to 10 wt % of fibrous material., such as kelp, papaya, molokheiya or plantago, in animal feed to assist in the evacuation of hairballs.

There are also a number of commercial products for the control and prevention of hairballs. Those that rely on a higher fiber content include Technical Hairball Formula by Martin Pet Foods; Iams Hairball Prevention Diets, Iams Active Maturity Hairball Care and Eukanuba Hairball Relief Formula; Proplan Advanced Hairball Control Formula and Purina Special Care Hairball Formula by Purina; Science Diet Hairball Control Formula and Science diet Feline Hairball Senior by Hills; 8 in 1 Kittymalt Hairball Remedy; EaglePack Adult Hairball Formula; and Royal Canin Hairball Control Formula. These products are typically a monocomponent pet food product in the form of dry kibble or tabs.

The commercial products that rely on a lubricant for the control of hairballs include Hartz Health Measures Hairball Remedy, Cat Lube Hairball and Digestive Aid, Petromalt Hairball Remedy, Femalt Hairball Remedy, and Vetbasis Hairball Relief Gel. These products typically include the lubricant in the form of a gel.

U.S. Patent Nos. U.S. Pat. Nos. 6,312,746; 6,254,910 and 6,117,477 all describe a multicomponent pet food product that includes a cereal based shell component completely surrounding an inner component to form a dual textured animal food product in which the shell component is harder than the inner component. The shell component has a total moisture content of less than about 20 wt % and contains at least one ingredient comprising a carbohydrate, fat, protein or combination thereof. The inner component is comprised of at least a mixture of lipid and solid ingredients. The inner component also has a water activity, $a_w$, of less than about 0.65 and a total moisture content of less than about 15 wt %. The above U.S. patents are herein incorporated by reference in their entirety.

The current hairball products are typically based on either high amounts of fiber or high amounts of lubricants. High amounts of fiber cause irritation of the intestinal lining of the animal. Products containing high amounts of lubricants are messy to handle. High amounts of both fiber and lubricants cause the hairball products to be quite unpalatable to most animals and especially to cat. This results in the animals not receiving effective amounts of the product necessary to control or prevent the formation of hairballs.

It would be desirable to provide a palatable edible product that includes ingredients for the control and prevention of hairballs in animals. The present invention provides a multiphased approach that incorporates a combination of ingredients for the control and prevention of hairballs in animals. In a preferred embodiment, this combination includes petrolatum, soluble and insoluble fibers, zinc and linoleic acid. The present invention also provides for enhanced palatability of the pet food product containing the hairball control ingredients, as well as, increased efficacy of the inventive food product for hairball treatment. Additionally, because the animal is more likely to consume more of the product of the present invention, that will even more effectively control and prevent hairball formation. Because of the combination of fiber and lubricant, the present invention provides utilizing lower amounts of both while being effective in reducing the side effects present when high amounts of either the fiber or lubricant are used alone.

SUMMARY OF THE INVENTION

The present invention provides a pet food product for hairball treatment that comprises a shell component completely surrounding an inner component to form one dual textured pet food product, wherein the shell component is harder than the inner component. The shell component comprises at least a dietary fiber and an additional fiber, wherein the additional fiber contains a soluble fiber and an insoluble fiber; and the inner component comprises at least a lubricant.

In the pet food product, the lubricant is petrolatum or mineral oil. In the pet food product, the soluble and insoluble fiber includes cellulose and beet pulp. In the pet food product, the dietary fiber includes 1 to 25 wt % and the additional fiber includes 2 to 12% of the food product. The food product further comprises zinc. The pet food product further includes linoleic acid.

The food product provides for a consumption ratio of 2:1 over a test composition. In the food product the lubricant comprises 2 to 20 wt % of the food product. In the food product the inner component has a water activity, $a_w$, of less than about 0.65 and a total moisture content of less than about 15 wt %.

The present invention further provides a process for controlling fecal hair excretion and formation in an animal comprising feeding the animal a composition comprising: a shell component completely surrounding an inner component to form one dual textured pet food product, wherein the shell component is harder than the inner component. The shell component comprises at least a dietary fiber and an additional fiber, wherein the additional fiber contains a soluble fiber and an insoluble fiber; and the inner component comprises at least a lubricant.

In the process, the lubricant is petrolatum or mineral oil. In the process, the lubricant comprises 2 to 20 wt % of the food product. In the process, the soluble and insoluble fiber include cellulose and beet pulp. In the process, the dietary fiber includes 1 to 25 wt % and the additional fiber includes 2 to 12% of the food product.

The present invention further provides a pet food product for hairball treatment comprising, a pet food product in which an animal consumes at least 2.88 g/day of the food product for the treatment of hairballs.

The present invention further provides a pet food product for hairball treatment comprising, a food product that provides for an increase of at least 15% of hair passage through a digestive tract of an animal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings.:

FIG. 1 is a schematic perspective view of one embodiment of a pet food product of the present invention;

FIG. 2 is a schematic sectional view, along section lines 2-2 of FIG. 1, of a pet food product of the present invention; and FIG. 3 is graphical representation of the difference in mean fecal hair loss expressed as grams/10 days between the cats on the pet food of the present invention and the cats on the control diet.

DETAILED DESCRIPTION OF THE INVENTION

The pet food product of the present invention provides for the control and prevention of hairballs in animals with a multi-phased approach incorporating a combination of ingredients. This combination comprises a lubricant, a soluble fiber and an insoluble fiber. In a preferred embodiment zinc and linoleic acid are also added.

As used herein, "lubricant" and "emollient laxative" can be used interchangeably.

As used herein "comprising" means one or at least one ingredient or element.

The present invention also provides for enhanced palatability of the pet food product containing the hairball control ingredients. As used herein "pet" is defined as a non-human animal.

The accumulation of groomed hair in the stomach of cats, rabbits and other animals that groom themselves predisposes the animal to coughing up trichobezoars ("hairballs") and in severe cases may lead to blockage of the gastrointestinal tract. Formulation of diets or treats that may help movement of hair through the gastrointestinal tract should aid in reduction of the incidence of hairball production and blockages.

The present invention provides a unique multi-phase approach to the problem of control and prevention of hairball formation. It incorporates a unique combination of different active ingredients in the multicomponent food product. The ingredients include a lubricant, such as soft paraffin or mineral oil to improve passage of hair through the digestive tract and both a soluble fiber and an insoluble fiber to trap the hair, which move it through the digestive tract, and aids in the overall health and function of digestive tract, thereby reducing the formation of hairball. In a preferred embodiment, zinc and linoleic acid are also added to strengthen the skin tissue, thus reducing the transepidermal water loss which thereby reduces hairloss and irritation. The soft parrafin (petroleum jelly/petrolatum), cellulose fiber and beet pulp work in combination to prevent settling and formation of hairballs in the stomach, while promoting the continuous movement and elimination of hair through the digestive tract.

Most hairball remedies consist of single action components, which do not function synergistically to aid passage and elimination. Current hairball products are typically based on either high amounts of fiber or high amounts of lubricants. High amounts of fiber, and particularly high amounts of cellulose, in diets for cats will result in irritation of the gut and stimulation of the peristaltic reaction. High amounts of either fiber and lubricants cause the hairball products to be quite unpalatable to most animals and especially to cats. This results in the animals not receiving effective amounts of the product necessary to control or prevent the formation of hairballs. Normally, ingested hair is partially softened and digested by the acids and enzymes present in the stomach. The sticky hair settles and is collected into hairballs in the stomach.

In the present invention, the non digestible/non soluble fiber mixes with the hair, adhering to its surface and preventing it from accumulating in large masses. The petrolatum lubricates the mass, allowing easy passage through the gastrointestinal tract. The beet pulp which is a partially soluble fiber prevents the hairball from becoming dehydrated. The unique combination of the softened texture and the lubrication and binding of the hair to the cellulose carrier results in a unique and highly effective means of transporting and eliminating the hair from the gastrointestinal tract of the animal. The addition of zinc and linoleic acid, in addition to improving skin and coat condition, also can serve to help mediate the immune response and reduce intestinal irritation.

The present invention overcomes these problems because it utilizes a combination of fiber and lubricant. Because of this combination, the present invention utilizes lower amounts of both fiber and lubricant, thus reducing the side effects present when high amounts of either the fiber or lubricant are used alone. This inventive combination has also shown a surprising increase in palatability while remaining very effective. The enhanced palatability of the inventive pet food product increases the efficacy of the inventive food product for hairball treatment. This is because the animal will consume an effective amount of the present invention for the control and prevention of hairball formation.

A preferred embodiment of the pet food product of the present invention includes a shell component completely surrounding an inner component to form one dual textured pet food product in which the shell component is harder than the inner component. The shell component comprises a soluble fiber and an insoluble fiber and the inner component comprises a lubricant. Thus, the invention provides a shelf-stable dual texture multicomponent pet food product containing an inner component contained within a shell or harder component having significantly improved palatability.

EXAMPLE 1

In Example 1, a preferred embodiment of the present invention is described. The ingredients of the hairball treat are shown in Table 1 below.

Dietary fiber is plant cellular material resistant to digestion by endogenous enzymes by mammals. The U.S. Federal Drug Administration compiles a list of dietary fiber that is incorporated herein by reference. Cellulose is the most preferred insoluble fiber. Another high source of dietary fiber is sugar beet pulp which includes both fermentable and non fermentable fiber. The main physiological effect of dietary fiber, that applies to cats, is on gastric emptying and small intestine transit times, resulting in an improved glucose tolerance, and subsequently on colonic transit time and large bowel functions. This prevents bowel diseases, especially constipation, due to the fermentation action of the colonic microflora or bulking action.

The amount of dietary fiber in the inventive pet food from cereal sources is in the range of 1 to 25 wt %. The amount of soluble and insoluble fibers present in the food product of the present invention is in addition to the amount of fiber from cereal sources normally present in pet food products. This additional fiber is in the range of 2 to 12 wt %, 3 to 10%, and preferably in the range of 4 to 8 wt %. The soluble and insoluble fibers in the present invention preferably are in the form of beet pulp fiber and cellulose. The mixture of beet pulp fiber and cellulose has been found to stimulate good intestinal functions and as such, helps to minimize hairballs. The fiber mixture is in the range of 1 to 6 wt % and preferably 2 to 4 wt % of beet pulp fiber and 1 to 6 wt % and preferably 2-4 wt % of cellulose powder.

A variety of compounds are used to assist in the passage of hairballs through the intestinal tract. These can broadly be placed in a number of categories. Bulk forming laxatives that absorb water, increase stool bulk and stimulate the intestinal muscles to promote passage, include natural soluble fibers such as psyllium, beet pulp and pumpkin, and a range of synthetic soluble fibers including cellulose ethers such as carboxymethyl cellulose which is a chemically altered form of cellulose. Hyperosmotic laxatives that promote the movement of water back into the intestinal tract include compounds such as polyethylene glycol, lactulose, sorbitol and glycerine (used as a suppository).

Emollient laxatives or lubricants such as mineral oil and petrolatum (soft paraffin) act by softening the hairball and provide lubrication to assist in passage through the gut. Other compounds include a class of compounds call anthraquinones like Aloe (active ingredient casanthrol), senna and cascansagrenda. They are non digestible, and when used at low levels have been proven safe in long term feeding studies on rats, dogs and other species. They are widely used for the commercial treatment of hairballs in cats, rats and rabbits. Normal inclusion in treats range from 4 to 16%. Long term usage at high levels of inclusion can result in interference with the absorption of fat soluble vitamins. It is contemplated that the amount of lubricants used in the present invention is about 0.3 gm/per daily feeding which is approximately 70 mg/kg body weight. This is comparable to the level of 0.4 gm/day as delivered by the Pounce Hairball™ treat. The lubricant can comprise at least 2 to 20 wt %, 4 to 15 wt % or more preferably 5 to 10 wt % of the pet food product of the present invention or any range therebetween.

In addition to the active ingredients of a lubricant to improve passage of hair through the digestive tract and the mixture of soluble and insoluble fiber to trap the hair and move it through the digestive tract, in a preferred embodiment, the dual textured pet food with hairball treatment of the present invention also includes a combination of zinc and linoleic acid to improve coat and skin condition and reduce shedding of hair. Preferably, the zinc is present in an amount of 380 to 580 mg/kg, 400 to 540 mg/kg, or 440 to 500 mg/kg or any range therebetween, most preferably 480 mg/kg and the linoleic acid is present in an amount of 0.5 to 10.0 wt %, preferably 1 to 8 wt % and most preferably 1.5 to 4 wt %. The sources of linoletic acid include at least vegetable oil, sunflower oil and safflower oil. The zinc and linoleic acid can be an ingredient of the shell component, the inner component or both. Additionally, the linoleic acid can be incorporated into a coating that is sprayed on the outside of the shell component.

The incorporation of the petrolatum, the soluble and insoluble fibers and the zinc and linoleic acid ingredients in the pet food product cause it to be highly palatable to cats. This makes it easy to meet the minimum feeding requirements necessary to achieve the functional benefits of this embodiment.

Animal consumption is measured by performing a feed performance study using a base diet, a test diet and a control diet. Feeding performance studies can be used to determine palatability. Feeding performance studies can be done using the following basic procedure. Animals (roughly 20 animals) are randomly selected to participate in the study. Preferably, cats are selected for the study. Once the animals are selected, a given amount of the base diet is placed in a bowl for the animal. After one hour, the base diet is removed. Four hours after feeding the base and/or standard diet, the animal is given the test diet and the control diet. One bowl contains a given amount of test diet (10 pieces of test treat, where about 0.566 g is equivalent to 1 piece) and a second bowl contains a given amount of control diet (10 pieces of control treat, where about 0.96 g is equivalent to 1 piece). The bowls are left with the animal for thirty minutes. During this time, which bowl the cat approaches first and which bowl the animal tastes first it tracked. Upon removal of the bowls, it is determined how much the animal consumed per bowl. This procedure is repeated for a period of days, for example four days, in which the placement of the bowls containing the test and control diet are alternated, for example, control on the left/test on the right on day 1; test on the left/control on the right on day 2, etc. The amount the animal consumes is equal to the daily average intake of the test product of all the animals during the study.

In one embodiment of the invention provides a dual texture edible product having an inner softer portion and a cereal based harder portion. The cereal based component forms a shell that surrounds the inner component. The inner component is preferably a mixture of lipids and solids. Such lipids include but are not limited to long or medium chain saturated or unsaturated, non-di or tri-acylglycerols.

Since this inner component has minimal water content and very low water activity levels, it does not require harsh sterilization techniques for preservation, additional ingredients for moisture control, or antimicrobial/antimycotic agents for stabilization. Ambient shelflife studies indicate that the product of the present invention is stable, while still maintaining superior feeding performance, even after one year.

In one preferred embodiment of the invention, an extruded shell product includes an inner material pumped into a shell extruder die plate and distributed evenly within extruded ropes. The filled extruded ropes are then crimped and cut to form a shape known in the food and pet food industry as "pillow" shapes. The extrusion product can utilize any convenient extrusion process.

Referring to FIGS. 1 and 2, a pet food product 10 has an outer portion 12 that surrounds an inner portion 14. The outer portion 14 includes soluble and insoluble fibers 16 in addition to the fiber in the food product derived from a cereal source. It should be appreciated that the food products illustrated in the Figures can be in any convenient size and shape, including individual bite-sized pieces and other conventional pet food product sizes in shapes such as a square, rectangular, round, oval, spherical, elliptical or donut shape. It would be apparent to one in the art to determine the appropriate size and shape for any particular animal application.

The inner component 14 can have a low total moisture content less than about 25 wt %, advantageously less than about 20 wt %, more advantageously less than about 15 wt % moisture, even more advantageously less than about 12 wt %, still more advantageously less than 10 wt %, even still more preferably less than 8 wt %, and most preferably less than 6 wt %

It is preferable that the inner component have a water activity, $a_w$ less than about 0.65, more advantageous that $a_w$ be less than about 0.50, still more advantageous that $a_w$ be less than about 0.40, and most advantageous that $a_w$ be less than about 0.35.

The inner component is in the proportion of about 5 to about 50 wt % of the total product. The harder outer component is a composition having a low total moisture content that is less than about 25 wt %. The harder outer component is a composition that preferably can include carbohydrates, fats, proteins, and combinations thereof.

In general, the proximate weight percent of elements for the inner component would be 36 wt % protein, 6 wt % ash, 42 wt % fat, 10 wt % carbohydrate, and 6 wt % moisture. The proximate weight percent for the raw batch meal used in the outer shell prior to extrusion is about 13 wt % protein, 7 wt % ash, 6 wt % fat, 4 wt % fiber from cereal sources, 40 wt % carbohydrate, and 10 wt % moisture. Fresh meat can be optionally added to the batch meal prior to extrusion. The protein/carbohydrate ratio would be adjusted to accommodate the meat addition, but the meat would nonetheless raise the fat content. The final product would have a moisture content less than about 12 wt % and a water activity below 0.6.

The present invention also contemplates a monocomponent pet food product for hairball treatment that would comprise, in addition to pet food ingredients known to those skilled in the art, a soluble fiber and an insoluble fiber, a lubricant, zinc, in an amount of 380 to 580 mg/kg and linoleic acid in an amount of 0.5 to 10 wt %. Preferably the lubricant is petrolatum or mineral oil and the fibers include cellulose and beet pulp in the amount of 1 to 6 wt % beet pulp and 1 to 6 wt % cellulose powder.

The present invention also provides for a process for controlling hair excretion and trichobezoar formation in an animal that includes feeding the animal a composition containing a shell component completely surrounding an inner component to form one dual textured pet food product, wherein the shell component is harder than the inner component. The shell component has a mixture of soluble and insoluble fiber. The inner component is formed from a mixture of ingredients that includes at least a lubricant.

In general, the specific processes, such as mixing, grinding, cooking, heating, extruding, or shell formation, used to make the pet food products of the present invention are well known in the industry. Further, such safety procedures as are required to produce a suitable pet food product are also well known in the art and are followed in practicing the present invention.

When using a digest, safe digest conditions are also well known, such as maintaining a pH between about 1.0 to about 5.0. In general, the harder shell ingredients are blended uniformly in the presence of a magnet before milling, a de-stoner is used during milling, and the milled product is tested with a metal detector to remove any potential damaging and unhealthy metal pieces and the ingredients are sifted. The sifter can be any convenient sifter such as, for example, an oscillating/vibrating bed sifter. The mill and sifter should be capable of producing, for a feline directed product, for example, a mean particle size from about 200μ to about 300μ. Other animals would require different particle sizes, as is well known in the field.

The safe handling of the inner component ingredients such as, for example, tallow, lard, digest, meat mix, and vegetable oil are also well known to one of ordinary skill in the pet food industry. The storage conditions are well known such as, for example, keeping the tanks at a temperature between 45° C. to about 75° C. The tallow generally is preferably delivered from a bulk delivery system tempered to about 55° C. to about 65° C. The tallow is preferably filtered through a U.S. Standard No. 18 Mesh filter (1,000 micron maximum opening). Such procedures for tallow are well known in the industry in order to produce a suitable healthful pet food product.

In general, it is recommended that the dry meal component of the inner component be added to the mixer first, followed by the tallow and other fat and oil ingredients during a batch operation process. Optionally, a continuous process can be used whereby the dry components of the inner component are simultaneously mixed with liquid tallow to form the inner component. Additionally, an emulsifier can be added to the tallow prior to mixing. Airborne particulates, dust, and splashing should be minimized as is known in the art in order to produce a suitable healthful pet food product. The liquid ingredients should be added and mixed until the dry ingredients are well mixed and coated with the fat and oil ingredients so that no dry material is observed. The absolute viscosity is preferably below about 25,000 cP in the temperature range of about 32° C. to about 50° C.

The tanks containing the ingredients of the inner component advantageously should be swept-surfaced and agitated, maintaining the product at a temperature of from about 40° C. to about 50° C. The agitators advantageously should be sized to prevent air entrapment from vortex formation. The speed of mixing advantageously should be controlled to prevent air entrapment from vortex formation. General procedures should be followed to prevent contamination from *Salmonella* and other microorganisms. Such procedures include, for example, maintaining sealed systems at positive pressure with filtered and UV treated air.

Any convenient method can be used to form the inner component, to form the outer shell material, to load the materials into an extruder, and to co-extrude the outer and inner materials. Such methods are well known to one of ordinary skill in the art in using the compositions of the present invention to produce the product of the present invention.

It would be apparent to one of ordinary skill in the art the proper rheological properties necessary for the particular conventional extruder being used. The use of mills, screens, filters, temperature control devices, safety equipment, controllers, etc. are well known in the art. It would be apparent to one in the art to prevent particles from damaging the equipment, or from being a hazard to the consumer, by removing such particles by any convenient method such as, for example, by filtering, screening, magnetic exclusion, and sedimentation.

Although any conventional extruder can be used, in one example, an extruder configured with a co-extrusion die configuration in a twin screw extruder was used. In one configuration, the product streams to the extruder included mixed meal, potable water, steam injection, pumpable meat inclusion, optionally tallow, and a corn oil extrusion-aid additive to form the shell. A preconditioner was used to prepare the meal for extrusion. In this case, although a small amount of water was added to the shell ingredients to aid in processing, the water was easily driven off by vaporization at the extrusion head or by low temperature drying at about 175° F. to about 250° F. (about 80° C. to about 116° C.) for about 20 minutes. The drying can be performed in two stages, about 10 minutes at about 175-220° F. (80-100° C.) followed by about 10 minutes at about 175-250° F. (80-116° C.).

The extruded rope containing the inner component surrounded by the harder outer shell material can be divided into convenient sized pieces that are closed at the ends so that the inner component is completely encased by the harder outer material. The dividing can be by any convenient process such as, for example, by using a crimper. Such crimpers are well known in the art.

Condensation onto the product stream should be avoided, and the process equipment should be chemically or steam sanitized. Other sanitary measures well known to one in the art should be followed in order to provide a healthy pet food product.

EXAMPLE 2

A feeding trial was conducted in order to show that the present invention promotes the passage of hair through the digestive tract of cats, thus reducing the amount of hair that could potentially accumulate as a gastric hairball. The trial was conducted as a crossover study, in which each cat served as its own control. Results indicated that the duel component pet food of the subject invention resulted in a statistically significant increase in amount of hair eliminated in the feces ($P<0.05$). At least twenty cats need to be included in a feeding trial in order to account for variations in the amount of hair defecated by individual cats.

As used in the present invention, a control diet consisted of a standard cat diet (any standard dry cat kibble as described below) and 10 pieces/day of the control treat. (See Table 2 for a list of ingredients.) A test diet consisted of a standard cat diet and 10 pieces/day of the hairball treat (test treat of the present invention). (See Table 1 for a list of ingredients.) The following pet food products can be used as the standard diet, a cat dry kibble, for example, but not limited to 9Lives™ (9Lives Super Supper Beef, Turkey, and Liver Flavors Dry Cat Food, 9Lives Super Supper Beef, Turkey, and Liver Flavors Dry Cat Food, 9Lives Tuna & Egg Dry Cat Food, 9Lives Tuna & Egg Dry Cat Food, 9Lives Tuna & Egg Dry Cat Food); Annamaet Cat & Kitten Food; Friskies™ (Chefs Blend Dry Cat Food, Friskies Gourmet Flavor,) Meow Mix, Purina™ and Cat Chow™. The control treat can utilize a pet food product such as Pounce Hairball™ treat.

The trial involved twenty cats in a crossover study lasting twenty eight days. There were four trial periods. Period 1 lasted four day in which all 20 cats were fed a control diet and total feces was collected for each cat to establish initial background levels of fecal hair elimination. Period 2 lasted ten days in which 10 cats, selected at random, continued to receive the control diet, while the other 10 received the test diet. All feces were collected and combined for each of 5 separate 2-day intervals for each cat over the 10 days. Period 3 lasted four days in which all 20 cats were fed only standard cat food and total feces per cat was collected as in Period 1 to provide a "washout" period between test periods. Period 4 lasted ten days in which the ten cats serving as controls in Period 2 became test animals. The test animals received the test diet. The ten test cats from Period 1 became the control group, receiving only the control diet. The fecal samples were again collected and composited for 2 day periods for each cat on both treatments as in Period 3.

Fecal samples for each cat were boiled twice in water to solubilise and disperse the fecal components and sieved through a 0.5 mm mesh analytical sieve to collect the hair. The wet sieved "crude" hair samples were oven dried at 60C and then dry sieved to remove adhering plant fiber particles before weighing. Because data from the 2 day collections in Period 2 indicated a great deal of sample to sample variation with no consistent pattern of hair loss ($p>0.05$: ANOVA repeated measures analysis (Proc GLM: SAS Institute, Cary, N.C.)), the 2 day samples for each cat in Period 4 were composited for the whole 10 day collection period for hair analysis. Fecal hair weight was analyzed using ANOVA for a linear model crossover design (Kuehl, 2000) including the effects of sequence, treatment, cat and period. The data in Table 3 and FIG. 3 show the data obtained in the trial.

TABLE 1

Hairball Treat Recipe

| Ingredient | Wt % | Component |
|---|---|---|
| Chicken By Product Meal | 27.364 | shell |
| Corn Whole | 23.028 | shell |
| Brewers Rice | 10.072 | shell |
| Blood Plasma | 7.306 | cream |
| Petrolatum | 6.264 | cream |
| Cat Digest | 6.000 | coating |
| Wheat Flour | 5.466 | cream |
| Beef Tallow | 4.349 | cream & coating |
| Corn Gluten Meal | 3.597 | shell |
| Cellulose Powder 40 | 2.996 | shell |
| Beet Pulp Powder | 1.998 | shell |
| Feline Vitamin/Mineral Premix | 1.583 | shell |
| Vegetable Oil - Stabilised | 1.482 | shell |
| Salt, Non Iodised | 0.288 | shell |
| Zinc Sulphate | 0.128 | shell |
| Petox - (BHA/BHT) | 0.018 | shell |
| Petox Liquid | 0.006 | cream |
| Water Moisture Balance | −1.945 | shell |
| TOTAL | 100.000 wt | |

TABLE 2

Control Treat Recipe

| Ingredient | Wt % | Component |
|---|---|---|
| Chicken By Product Meal | 29.026 | shell |
| Corn Whole | 22.486 | shell |
| Brewers Rice | 8.958 | shell |
| Blood Plasma | 0.000 | cream |
| Petrolatum | 0.000 | |
| Cat Digest | 6.000 | coating |
| Wheat Flour | 13.500 | cream |
| Wheat Gluten | 4.300 | shell |
| Beef Tallow | 11.776 | cream & coating |
| Corn Gluten Meal | 5.017 | shell |
| Cellulose Powder 40 | 0.000 | |
| Beet Pulp Powder | 0.000 | |

TABLE 2-continued

Control Treat Recipe

| Ingredient | Wt % | Component |
|---|---|---|
| Feline Vitamin/Mineral Premix | 1.577 | shell |
| Vegetable Oil - Stabilised | 0.000 | shell |
| Salt, Non Iodised | 0.287 | shell |
| Zinc Sulphate | 0.000 | |
| Petox - (BHA/BHT) | 0.018 | shell |
| Petox Liquid | 0.006 | cream |
| Water Moisture Balance | −2.944 | shell |
| TOTAL | 100.007 wt % | |

TABLE 3

Results of Crossover Trial

| Trial 1 (g/10 D) | | | Trial 2 (g/10 D) | | |
|---|---|---|---|---|---|
| TEST 1 | 100A | 2.31 | TEST 1 | 100k | 6.74 |
| 2 | 100B | 4.25 | 2 | 100l | 4.93 |
| 3 | 100c | 1.95 | 3 | 100m | 4.77 |
| 4 | 100D | 5.28 | 4 | 100n | 7.57 |
| 5 | 100E | 1.66 | 5 | 100p | 7.05 |
| 6 | 100F | 5.96 | 6 | 100q | 3.84 |
| 7 | 100G | 2.10 | 7 | 100r | 4.52 |
| 8 | 100H | 3.49 | 8 | 100s | 10.15 |
| 9 | 100I | 2.74 | 9 | 100t | 2.76 |
| 10 | 100J | 2.52 | 10 | 100u | 11.43 |
| TOTAL | | 32.94 $\bar{x}$ | TOTAL | | 63.76 $\bar{x}$ |
| | | (10) 32.3 G | | | (10) 6.38 G |
| CONTROL 1 | 100K | 4.98 | CONTROL 1 | 100a | 3.08 |
| 2 | 100l | 1.25 | 2 | 100b | 9.32 |
| 3 | 100m | 1.82 | 3 | 100c | 1.14 |
| 4 | 100n | 4.87 | 4 | 100d | 3.98 |
| 5 | 100P | 1.93 | 5 | 100e | 1.97 |
| 6 | 100Q | 1.99 | 6 | 100f | 6.74 |
| 7 | 100R | 3.01 | 7 | 100g | 3.72 |
| 8 | 100S | 8.83 | 8 | 100h | 4.04 |
| 9 | 100T | 2.82 | 9 | 100i | 3.55 |
| 10 | 100U | 6.15 | 10 | 100j | 2.80 |
| TOTAL | | 37.65 $\bar{x}$ 3.77 g | TOTAL | | 40.34 $\bar{x}$ 4.03 g |

As illustrated in Table 3 and FIG. 3, the cats that received the test diet (dual textured pet food with hairball treatment or hairball treat) had a hair recovery rate over 50% greater than the control group (6.38 vs. 4.03 g). FIG. 3 illustrates the difference in amount of fecal hair loss for each cat between the Period when each cat was receiving the test diet (dual textured pet food with hairball treatment or hairball treat) and the Period when each cat was receiving the control diet. Statistical analysis showed there was a significantly greater (P<0.05) amount of hair loss in the feces of cats receiving the pet food of the present invention than in cats not receiving the inventive pet food. There was no significant effect of sequence (the order in which the cat was treated, i.e. treatment-control versus control-treatment) but results between individual cats and between the two periods were different (p<0.05).

As indicated in FIG. 3, when the amount of fecal hair loss for each is expressed as a difference between the Period when the cats received dual textured pet food with hairball treatment and the Period when the cats received the control diet, 11 of 20 cats showed a distinct increase, 3 showed little change, and 6 produced less hair, so that overall the present invention gave an average of 23% increase in hair passed. The passage of hair through the digestive tract is increased by at least 15% and from about 15 to 50%; preferably at least by 20% and from about 20 to 40%; and most preferably at least by 22% and from about 22 to 33% as a result of feeding a cat the inventive food product. Thus the trial clearly shows that the present invention promotes the passage of hair through the digestive tract of cats, therefore reducing the amount of hair that could potentially accumulate as a gastric hairball.

EXAMPLE 3

A feeding performance trial was conducted in order to show that the palatability of the pet food product for hairball treatment is preferred to another hairball treatment when offered to a panel of cats. The pet foods used in the trial were a cat dry kibble control diet (Base Diet), the dual textured pet food product for hairball treatment of the present invention (Diet A) (See Table 1 for a list of ingredients) and a control composition, Pounce Hairball™ treat manufactured by Del Monte Foods (Diet B). The following pet food products can be used as the control diet, a cat dry kibble, for example, but not limited to 9Lives™ (9Lives Super Supper Beef, Turkey, and Liver Flavors Dry Cat Food, 9Lives Super Supper Beef, Turkey, and Liver Flavors Dry Cat Food, 9Lives Tuna & Egg Dry Cat Food, 9Lives Tuna & Egg Dry Cat Food, 9Lives Tuna & Egg Dry Cat Food); Annamaet Cat & Kitten Food; Friskies™ (Chefs Blend Dry Cat Food, Friskies Gourmet Flavor,) Meow Mix, Purina™ and Cat Chow™.

The composition of the control diet, the Pounce Hairball™ Tender Chicken Flavor treat, is as follows in which the ingredients are listed in descending order of wt %: malt syrup, mineral oil, pregelatinized wheat flour, wheat flour, water, soy flour, beef, fructrose, glycerine, animal digest, dried egg product, chicken meal, torula yeast, sugar, salt, dried cheddar cheese, phosphoric acid, gum arabic, chicken stock, potassium chloride, potassium sorbate, cellulose gum, titanium dioxide, calcium sulfate, red 40, and BHA. Test procedures for determining feeding performance and feeding preferences are well known to one of ordinary skill in the art.

A panel of twenty cats were used for the trial. The cats received the Base Diet at the 8:00 A.M. feeding. The base diets remained with the cats for one hour and was removed at 9:00 A.M. the same day. The cats were allowed a four-hour rest period and Diet A and Diet B were presented at 1:00 P.M. The cats were observed for a total of five minutes for product "first approached first tasted" and the results were recorded. The pet food of Diet A and Diet B was removed at 1:30 P.M. for a feeding time of thirty minutes. The amount fed and the residue of the base diet and both test products was weighed on an electronic scale with a direct link to a computer to ensure optimum accuracy. Each bowl was marked with the cats' number and an 'A' or 'B' to identify the test products. The placement of the diets was altered each day and the procedure was carried out for four days. The feed amount of each diet was ten pieces (about 5.5 to 5.8 grams/10 pieces). The results are as follows:

TABLE 4

Daily Average Diet Intakes per Animal

| | Diet A (by pieces) | Diet B (by pieces) | Total (by pieces) |
|---|---|---|---|
| Day 1 | 7.0 | 3.0 | 10.0 |
| Day 2 | 9.0 | 5.0 | 13.0 |
| Day 3 | 8.0 | 4.0 | 12.0 |
| Day 4 | 9.0 | 4.0 | 13.0 |
| Average | 8.0 | 4.0 | 12.0 |

TABLE 5

Animal Average Diet Intakes

| Animal ID | Diet A (pc) | Diet A (g/pc) | Diet B (pc) | Diet B (g/pc) | Total (pc) | Total (g/pc) |
|---|---|---|---|---|---|---|
| 001518332 | 10.0 | 0.610 | 0.0 | 0.970 | 10.0 | 1.580 |
| 127409696A | 10.0 | 0.583 | 1.0 | 0.950 | 11.0 | 1.533 |
| 131161172A | 10.0 | 0.573 | 9.0 | 1.020 | 19.0 | 1.593 |
| 131222794A | 9.0 | 0.571 | 1.0 | 0.970 | 9.0 | 1.541 |
| 131233197A | 10.0 | 0.435 | 7.0 | 1.010 | 17.0 | 1.445 |
| 131237393A | 10.0 | 0.589 | 6.0 | 0.910 | 16.0 | 1.499 |
| 131237491A | 6.0 | 0.572 | 2.0 | 1.010 | 7.0 | 1.582 |
| 131238245A | 7.0 | 0.552 | 5.0 | 0.940 | 12.0 | 1.492 |
| 131277514A | 9.0 | 0.601 | 9.0 | 1.030 | 18.0 | 1.631 |
| 131309273A | 10.0 | 0.567 | 2.0 | 0.920 | 11.0 | 1.487 |
| 131352662A | 9.0 | 0.561 | 5.0 | 1.010 | 14.0 | 1.571 |
| 132611471A | 5.0 | 0.620 | 0.0 | 0.950 | 5.0 | 1.570 |
| 132621115A | 9.0 | 0.575 | 2.0 | 0.920 | 11.0 | 1.495 |
| 132631335a | 7.0 | 0.437 | 0.0 | 0.990 | 7.0 | 1.427 |
| 132936162A | 3.0 | 0.590 | 1.0 | 0.860 | 4.0 | 1.450 |
| 132952762A | 10.0 | 0.653 | 7.0 | 0.960 | 17.0 | 1.613 |
| 132954635A | 8.0 | 0.560 | 8.0 | 1.000 | 15.0 | 1.560 |
| 132961477A | 8.0 | 0.542 | 8.0 | 0.950 | 16.0 | 1.492 |
| 132973643A | 3.0 | 0.676 | 0.0 | 0.930 | 3.0 | 1.606 |
| 133116331A | 10.0 | 0.478 | 9.0 | 0.940 | 19.0 | 1.418 |
| Average: | 8.0 | 0.567 | 4.0 | 0.962 | 12.0 | 1.529 |

TABLE 6

Animal First Reaction

|  | Diet A | Diet B | Total (80 possible) |
|---|---|---|---|
| First Approached | 58 | 20 | 78 |
| First Approached % | 74.4% | 25.6% | 100.0% |
| First Tasted | 64 | 12 | 76 |
| First Tasted % | 84.2% | 15.8% | 100.0% |

The above Tables 4-6 illustrate the following: Out of a total of seventy eight approaches, Diet A was first approached more often than Diet B with a ratio of 2.9:1. Out of a total of seventy six tastes, Diet A was first tasted more often than Diet B with a ratio of 5.3:1. There was a possibility of eighty "first reactions" (20 cats over 4 days of feedings). The average diet intakes (in pieces) of the animals for Diet A and Diet B were 8.0 and 4.0, for a consumption ratio of 2.0:1, respectively. More specifically, the average intake includes at least 2.88 g/day, 3.45 g/day, 4.02 g/day, 4.59 g/day, 5.16 g/day or 5.73 g/day. Most preferably is 5.73 g/day. The Daily Average Diet Intakes per Animal and the Animal Average Diet Intakes were determined by taking the total intake of each diet by a total of all of the cats and dividing the totals by the number of cats and the number of days.

The statistically analyzed data was based on the number of pieces consumed per cat per day. After statistical analysis of variation, it was determined that there was a significant difference in palatability between the dual textured pet food product for hairball treatment of the present invention and Pounce Hairball™ treat when offered to this panel of cats (a=0.05). Thus, the dual textured pet food with hairball treatment was significantly more palatable than other product for hairball control and formation.

The pet food product with hairball treatment of the present invention combines a unique combination of different active ingredients for the control and elimination of hairballs in animals. The combination of ingredients improve passage of hair through the digestive tract; aids in the overall health and function of digestive tract, thereby reducing the formation of hairball; and improves the coat and skin condition of the animal thereby reducing the shedding of hair. The incorporation of these ingredients in the duel component food product is highly palatable to cats which allows the cats to eat the amount of the hairball treatment necessary to achieve the functional benefits of the present invention.

The pet food product of the present invention is first approached at least 30%, at least 40%, at least 50% at least 60%, at least 70%, at least 80%, at least 90% or at least 100% or any range therebetween more than the control diet. Still further, the pet food product of the present invention is first tasted at least 20%, at least 30%, at least 40%, at least 50%, at least 60%, at least 70%, at least 80%, at least 90%, or at least 100% or any range therebetween more than the control diet. The first approach is improved for the test product at least 25%, at least 35%, at least 45%, at least 55%, at least 65%, at least 75%, at least 85%, at least 95%, at least 105%, at least 115%, at least 125%, at least 135%, at least 145%, at least 155%, at least 165%, at least 165%, at least 175%, at least 185%, at least 195%, at least 200%. The first tasted is improved for the test product at least 25%, at least 35%, at least 45, at least 50%, at least 60%, at least 70%, at least 80%, at least 90%, at least 100%, at least 120%, at least 130%, at least 140% at least 150%, at least 16%, at least 170%, at least 180%, at least 190%, at least 200%, at least 225%, at least 250%, at least 275%, at least 300%, at least 325%, at least 350%, at least 375%, at least 400%, at least 425%, at least 450%, at least 475%, at least 500% or any range therebetween.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

We claim:

1. A palatable pet food product for hairball treatment comprising:
   a shell component completely surrounding an inner component to form one dual textured pet food product, wherein the shell component is harder than the inner component;
   said shell component having a total moisture content of less than 20% and containing at least one ingredient comprising a dietary fiber and an additional fiber, wherein said additional fiber contain a soluble fiber and an insoluble fiber; and wherein the shell component comprises corn, rice, cellulose, and beet pulp; and wherein the cellulose and beet pulp combined comprise less than 12% by weight of the food product;
   said inner component having a water activity, $a_w$, of less than 0.65, and comprising at least a lubricant and solid ingredients, wherein the lubricant is more than 2 wt % but less than 10 wt % of the food product; wherein the inner component comprises petrolatum, and beef tallow, but excludes malt syrup;

wherein the additional fibers and the lubricant provide for a palatable pet food product for hairball treatment;

wherein no more than 6 grams/day of the pet food product must be voluntarily consumed by the pet in order to provide for an increase of at least 15% of hair passage through a digestive tract of an animal; and wherein the food product further comprises zinc and linoleic acid.

2. The food product of claim 1, wherein the food product provides for a consumption ratio of 2:1 over a test composition.

3. The food product of claim 1, wherein the lubricant is 4 to 8 wt % of the food product.

4. The food product of claim 1, wherein the inner component has a total moisture content of less than about 15 wt %.

5. A process for controlling fecal hair excretion and formation in an animal comprising feeding said animal a composition comprising:

a shell component completely surrounding an inner component to form one dual textured pet food product, wherein the shell component is harder than the inner component;

said shell component having a total moisture content of less than 20% and containing at least one ingredient comprising a dietary fiber and an additional fiber, wherein said additional fiber contain a soluble fiber and an insoluble fiber; and wherein the shell component comprises corn, rice, cellulose, and beet pulp; and wherein the cellulose and beet pulp combined comprise less than 12% by weight of the food product;

said inner component having a water activity, $a_w$, of less than 0.65, and comprising at least a lubricant and solid ingredients, wherein the lubricant is more than 2 wt % but less than 10 wt % of the food product; wherein the inner component comprises petrolatum, and beef tallow, but excludes malt syrup;

wherein the additional fibers and the lubricant provide for a palatable pet food product for hairball treatment;

wherein no more than 6 grams/day of the pet food product must be voluntarily consumed by the pet in order to provide for an increase of at least 15% of hair passage through a digestive tract of an animal; and wherein the food product further comprises zinc and linoleic acid.

6. The process of claim 5, wherein the lubricant is 4 to 8 wt % of the food product.

7. The pet food product of claim 1, wherein an animal voluntarily consumes at least 2.88 g/day of the two component food product for the treatment of hairballs.

* * * * *